(12) United States Patent
Santilli

(10) Patent No.: US 9,764,335 B2
(45) Date of Patent: Sep. 19, 2017

(54) RECLAMATION OF METALS FROM A FLUID

(71) Applicant: MAGNEGAS CORPORATION, Tarpon Springs, FL (US)

(72) Inventor: Ermanno Santilli, Clearwater, FL (US)

(73) Assignee: MAGNEGAS CORPORATION, Clearwater, FL (US)

( * ) Notice: Subject to any disclaimer, the term of this patent is extended or adjusted under 35 U.S.C. 154(b) by 171 days.

(21) Appl. No.: 14/703,246

(22) Filed: May 4, 2015

(65) Prior Publication Data

US 2015/0321200 A1    Nov. 12, 2015

Related U.S. Application Data

(60) Provisional application No. 61/988,973, filed on May 6, 2014.

(51) Int. Cl.
| | |
|---|---|
| *B03C 5/02* | (2006.01) |
| *C02F 1/48* | (2006.01) |
| *B03C 5/00* | (2006.01) |
| *C02F 1/46* | (2006.01) |
| *C02F 103/10* | (2006.01) |
| *C02F 101/20* | (2006.01) |
| *C02F 103/00* | (2006.01) |

(52) U.S. Cl.
CPC .......... *B03C 5/02* (2013.01); *B03C 5/00* (2013.01); *C02F 1/4608* (2013.01); *C02F 1/48* (2013.01); *C02F 1/484* (2013.01); *C02F 2101/20* (2013.01); *C02F 2103/007* (2013.01); *C02F 2103/10* (2013.01); *C02F 2201/48* (2013.01)

(58) Field of Classification Search
CPC . B03C 5/02; B03C 5/00; C02F 1/4608; C02F 1/48; C02F 1/484; C02F 2101/20; C02F 2103/007; C02F 2103/10; C02F 2201/48; C02F 1/46; C02F 1/54; C02F 2209/06; C10L 3/12; C10L 1/00; C10L 3/003; C10L 3/06; C10L 3/10
See application file for complete search history.

(56) References Cited

U.S. PATENT DOCUMENTS

| | | |
|---|---|---|
| 3,003,939 A | 10/1961 | Rouy |
| 4,567,343 A | 1/1986 | Sullivan et al. |
| 5,399,829 A | 3/1995 | Ogilvie |
| 6,074,537 A * | 6/2000 | Marks ............... C02F 1/42 204/263 |
| 7,780,924 B2 | 8/2010 | Santilli |

(Continued)

*Primary Examiner* — Xiuyu Tai
(74) *Attorney, Agent, or Firm* — Larson & Larson, P.A.; Frank Liebenow

(57) ABSTRACT

A system for extracting metals (e.g. precious metals or dangerous metals) from a substrate material such as sludge from a lake bed or sewage treatment facility includes processing the substrate material and metals by exposing the substrate material and metals to the plasma of an electric arc. Then, the exposed substrate material and metals are passed through an electrically charged collection grid in which the metals, now electrically charged, are attracted to the collection grid and hold to the collection grid and the substrate material exits the collection grid with less concentrations (or none) of the metals. In some embodiments, in addition to recovering the metals (e.g. precious metals, dangerous metals, etc.), a flammable gas is produced.

5 Claims, 3 Drawing Sheets

(56) References Cited

U.S. PATENT DOCUMENTS

| | | |
|---|---|---|
| 8,236,150 B2 | 8/2012 | Santilli |
| 2001/0050255 A1* | 12/2001 | Barrett ................ C02F 1/46 210/710 |
| 2003/0133855 A1 | 7/2003 | Santilli |
| 2009/0235637 A1 | 9/2009 | Foret |
| 2012/0000787 A1 | 1/2012 | Santilli |

* cited by examiner

RECLAMATION OF METALS FROM A FLUID

CROSS-REFERENCE TO RELATED APPLICATION

This application claims the benefit of U.S. provisional application No. 61/988,973 filed on May 6, 2014, the disclosure of which is incorporated by reference.

FIELD

This invention relates to the field of reclamation and more particularly to a system, method and apparatus for reclaiming metals such a precious or toxic metals.

BACKGROUND

There are many instances in which precious metals or toxic metals are suspended in a material. There are many bodies of water (e.g., lake beds, river beds, sewage, and sludge) in which precious metals or toxic metals are suspended within silt and water forming, for example, sludge. Likewise, effluent from certain mining or processing operations includes some concentration of precious metals or toxic metals such as the metals that are being mined. With prior technology, it was not cost effective to extract the precious metals or toxic metals from these material so the material remains, in some cases, polluting the area around where the material is present (e.g. cadmium and lead suspended in sludge in a lake bed).

Often there is value to these materials if sufficient quantity is extracted from the sludge, but prior systems were incapable of a cost-effective extraction of precious metals or toxic metals, especially when such precious metals or toxic metals are suspended in low concentrations.

What is needed is a system that will extract metals that are suspended in a material such as sludge or water.

SUMMARY

A system for extracting metals (e.g. precious metals or dangerous metals) from a substrate material such as sludge from a lake bed or sewage treatment facility includes processing the substrate material and metals by exposing the substrate material and metals to the plasma of an electric arc. Then, the exposed substrate material and metals are passed through an electrically charged collection grid in which the metals, now electrically charged, are attracted to the collection grid and hold to the collection grid and the substrate material exits the collection grid with less concentrations (or none) of the metals. In some embodiments, in addition to recovering the metals (e.g. precious metals, toxic metals, etc.), a flammable gas is produced.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
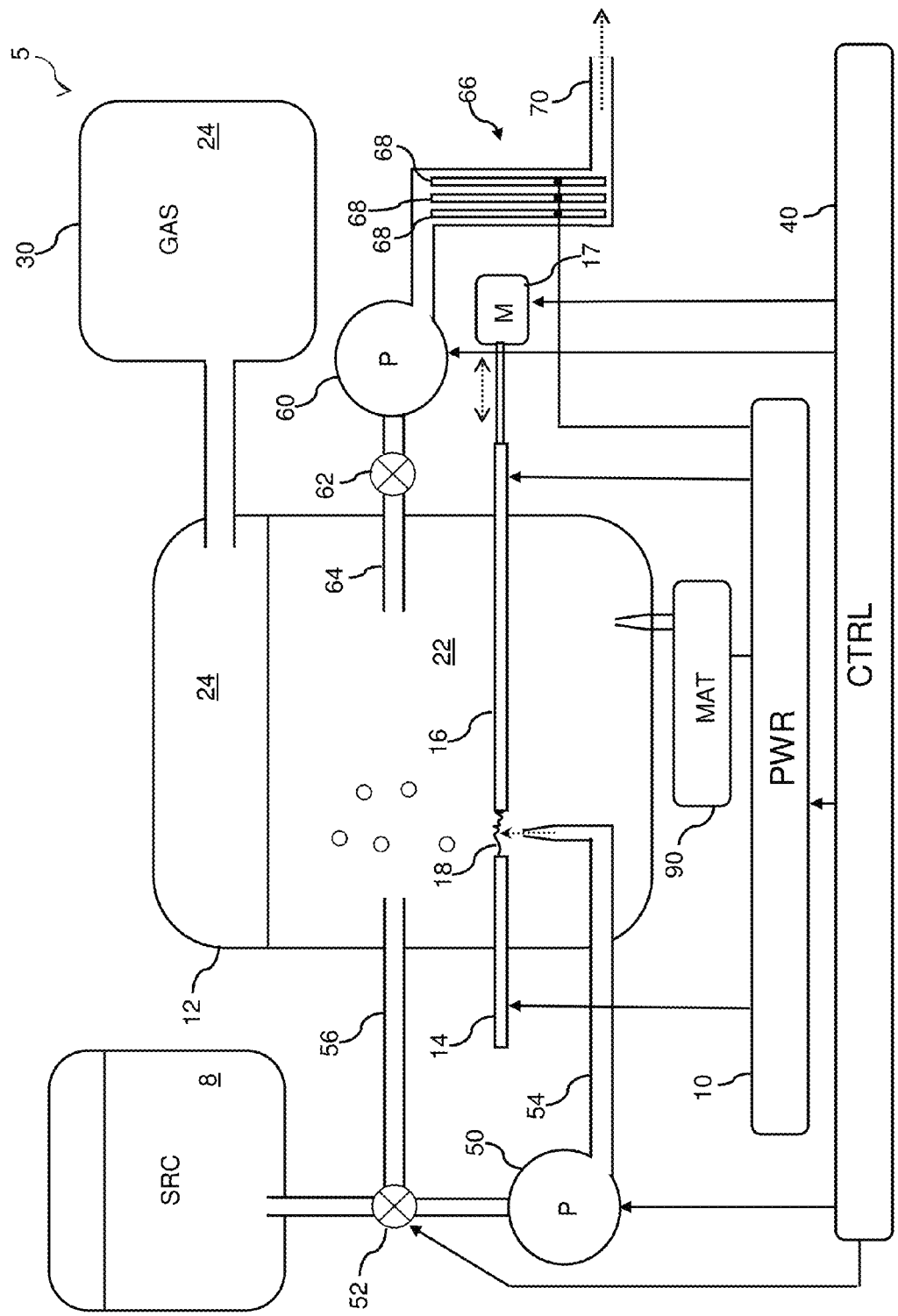
FIG. 1 illustrates a schematic view of an exemplary system for recovering metals.

Reference will now be made in detail to the presently preferred embodiments of the invention, examples of which are illustrated in the accompanying drawings. Throughout the following detailed description, the same reference numerals refer to the same elements in all figures.

Throughout this description, system for recovering metals 5 is described as a system for processing a material that contains suspended particles of metals such as silver and gold or toxic metals or materials such as cadmium. For simplification, this source material will be referred to as sludge 8 as in sludge that is often found on the floor of water bodies, though any material is anticipated for processing by the system for recovering metals 5. Another example of such material is solvents used in processing integrated circuits and circuit boards, etc. Another example of such material is effluent from mining operations.

Figure 2:
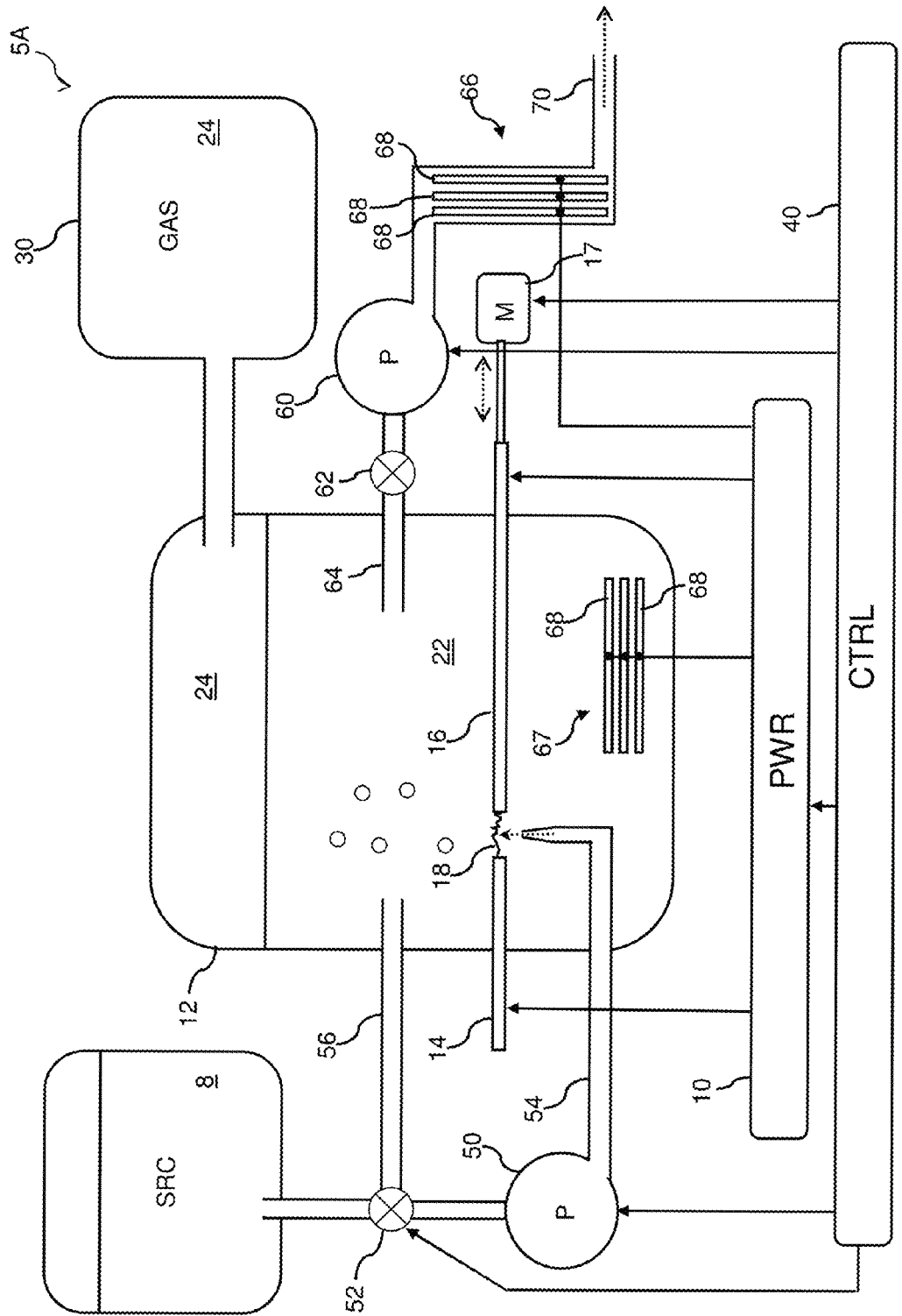
FIG. 2 illustrates a schematic view of an exemplary system for recovering metals.

Referring to FIGS. 1 and 2, exemplary systems 5/5A for recovering metals such as precious metals or toxic metals are shown. In addition to recovering such metals (e.g. precious metals or toxic metals), in some embodiments, a flammable gas 24 is also produced. The systems for recovering precious metals 5/5A are examples of systems 5/5A for recovering precious metals, as other such systems 5/5A and configurations are also anticipated. The recovery on metals from the sludge 8 starts with exposing the sludge 8 to a plasma 18 of an electric arc. The sludge 8 is pumped through a valve 52 by a feed pump 50 and into the reactor 12 where it is known as feedstock 22. The electrodes 14/16 and plasma 18 of the arc are submerged within the feedstock 22 as the feedstock is circulated within the reactor 12 and re-injected into the plasma 18 of the electric arc between the two electrodes 14/16. The plasma 18 causes the feedstock 22 to react, depending upon the composition of the feedstock 22 and the composition of the electrodes 14/16 used to create the arc.

The electrodes 14/16 are made of any known conductive material or materials. In some embodiments, one or both electrodes 14/16 are made of a sacrificial material (e.g. carbon), in that, some portion of the electrode(s) 14/16 is sacrificed and combined with atoms/molecules of the feedstock 22 to form a gas 24, typically a combustible gas 24. In some embodiments, one or both electrodes 14/16 are made from a material (e.g. a metal such as copper, tungsten, steel, etc.) that does not readily sacrifice atoms to the arc and, therefore, require less adjustment and replacement. In some embodiments, one electrode 14/16 is made of a sacrificial material (e.g. carbon) while the other electrode 14/16 is made of a non-sacrificial material (e.g. copper).

Any feedstock 22 containing any amount of metals (e.g., precious metals or toxic metals) is anticipated either in fluid form or fluid mixed with solids, preferably fine-grain solids such as gold dust, etc. The gas 24 produced in this process is typically combustible and the composition of the gas 24 is dependent upon the fluid base of the feedstock 22 and the composition of the electrodes 14/16.

In examples in which the feedstock 22 is a petroleum-based liquid having there within precious metals, the exposure of this petroleum-based feedstock 22 to the arc (as above) results in a gas that includes polycyclic aromatic hydrocarbons which, in some embodiments, are quasi-nanoparticles that are not stable and, therefore, some of the polycyclic aromatic hydrocarbons will form/join to become nanoparticles or a liquid. Therefore, some polycyclic aromatic hydrocarbons as well as some carbon particles/nanoparticles are present in the resulting gas 24. In some embodiments, some of the carbon particles or nanoparticles are trapped or enclosed in poly cyclic bonds. Analysis of the produced gas 24 typically includes polycyclic aromatic hydrocarbons that range from C6 to C14. The presence of polycyclic aromatic hydrocarbons as well as carbon particles or nanoparticles contributes to the unique burn properties of the resulting gas 24. This leads to higher burning temperatures.

In another example, the feedstock 22 is used motor oil and at least one of the electrodes 14/16 are carbon. In this, the petroleum molecules separate within the plasma of the electric arc 18 into a gas 24 that includes hydrogen ($H_2$) and aromatic hydrocarbons, which percolate to the surface of the petroleum liquid 22 for collection. In some embodiments, the gas 24 produced though this process includes suspended carbon particles since at least one of the electrodes of the arc 18 is made from carbon and serves as the source for the charged carbon particles or nanoparticles that travel with the manufactured hydrogen and aromatic hydrocarbon gas 24 and are collected along with, for example, the hydrogen and aromatic hydrocarbon molecules, thereby changing the burning properties of the resulting gas 24, leading to a hotter flame. In this example, if the feedstock 22 is used motor oil and the fluid/gas 24 collected includes any or all of the following: hydrogen, ethylene, ethane, methane, acetylene, and other combustible gases to a lesser extent, plus suspended charged carbon particles or nanoparticles that travel with these gases. Used motor oil often has fine grain particles of metal suspended there within. Although such metals are typically not valuable for recovery, in some instances, it is important to remove these particles of metal during the processing of used motor oil, while in other instances, such metals are of importance depending upon the metals of the motor in which such used motor oils was used.

For simplicity, the produced gas 24 is shown being collected in a tank 30 for later use.

In operation, the circulation valve 52 is set to open by the controller 40, connecting the source of sludge 8 to the pump 50 and the pump 50 is controlled to operate and fill the reactor 12 to a certain level with feedstock 22. As the process continues, it is anticipated that the above is repeated as the feedstock 22 depletes, e.g., as the gas 24 is produced. Note, at this time the exit valve 62 is closed so that no feedstock 22 exits the reactor 12.

Once sufficient feedstock 22 is within the reactor 12, the valve 52 is controlled by the controller 40 to circulate and the feedstock 22 is pumped from the reactor 12 through a feed pipe/tube 56 and back out through an injection pipe 54 by the circulation pump 50. This flow is directing the circulation of feedstock 22 directly into the plasma 18 of the arc between the electrodes 14/16. In some embodiments, the flow of the feedstock 22 is directed through one or both of the electrodes 14/16 for better positioning within the plasma 18.

In the system 5 of FIG. 1, when sufficient feedstock 22 has been exposed to the plasma 18 of the arc, the exit valve 62 is opened and the exit pump 60 is operated to pump some or all of the processed feedstock 22 out of the reactor through an exit pipe/tube 64. The feedstock 22 that has been exposed to the plasma 18 then passes through one or more plates 68 of a collection grid 66. Each of the plates is electrically charged, either positively or negatively with respect to the feedstock 22 that has been exposed to the plasma 18. During exposure to the plasma 18 of the arc, the suspended metal particles (e.g. suspended precious metal particles or suspended toxic metal particles) gain or lose electrons and, therefore, become either positively or negatively charged. As the charged suspended metal particles (e.g. suspended precious metal particles or suspended toxic metal particles) pass close to the plates 68 of the collection grid 66, by nature of such charge with respect to the specific charge on the plates 68, the plates 68 attract the metal particles (or suspended metal particles) and the metal particles (e.g. suspended precious metal particles or suspended toxic metal particles) collect on the plates 68. At some point, the system is shut down and the metal particles (e.g. suspended precious metal particles or suspended toxic metal particles) are removed (e.g., scraped) from the plate(s) 68.

In the system 5A of FIG. 2, as the feedstock 22 is been exposed to the plasma 18 of the arc, some or all of the processed feedstock 22 passes through or close to one or more plates 68 of a collection grid 67. Each of the plates 68 is electrically charged, either positively or negatively with respect to the feedstock 22 that has been exposed to the plasma 18. During exposure to the plasma 18 of the arc, the suspended metal particles (e.g. suspended precious metal particles or suspended toxic metal particles) gain or lose electrons and, therefore, become either positively or negatively charged. As the charged suspended metal particles pass close to the plates 68 of the collection grid 67, by nature of such charge with respect to the specific charge on the plates 68, the plates 68 attract the metal particles (e.g. precious metal particles or toxic metal particles) which collect on the plates 68. At some point, the system is shut down and the metal particles (e.g. suspended precious metal particles or suspended toxic metal particles) are removed (e.g., scraped) from the plate(s) 68.

After the metal particles are collected by the plate(s) 68 of a collection grid 66/67, remaining material (e.g. sludge) exits the system through an outlet 70 for further processing. Such material that exits through the outlet 70 has less or no suspended metal particles as such have been extracted and attach to the plate(s) 68.

Note that, based upon the charge applied to the metal particles, it is anticipated that in some embodiments, the plate(s) 68 are positively charged while in some embodiments, the plate(s) 68 are negatively charged. In some embodiments, some plates 68 are positively charged and some plates 68 are negatively charged.

In some embodiments, a solvent, thinner, or coagulant material 90 is mixed into the feedstock 22 under control of the controller 40. In such, the material 90 improves adhesion of the suspended metal particles to the plates 68, improves flow of the feedstock 22, changes the specific gravity of the feedstock with respect to the suspended metal particles, etc., such that the precious metal particles either adhere better to the plates 68, or fall to the bottom of the reactor 12, or float to the top of the feedstock 22 for collection from the surface.

Figure 3:
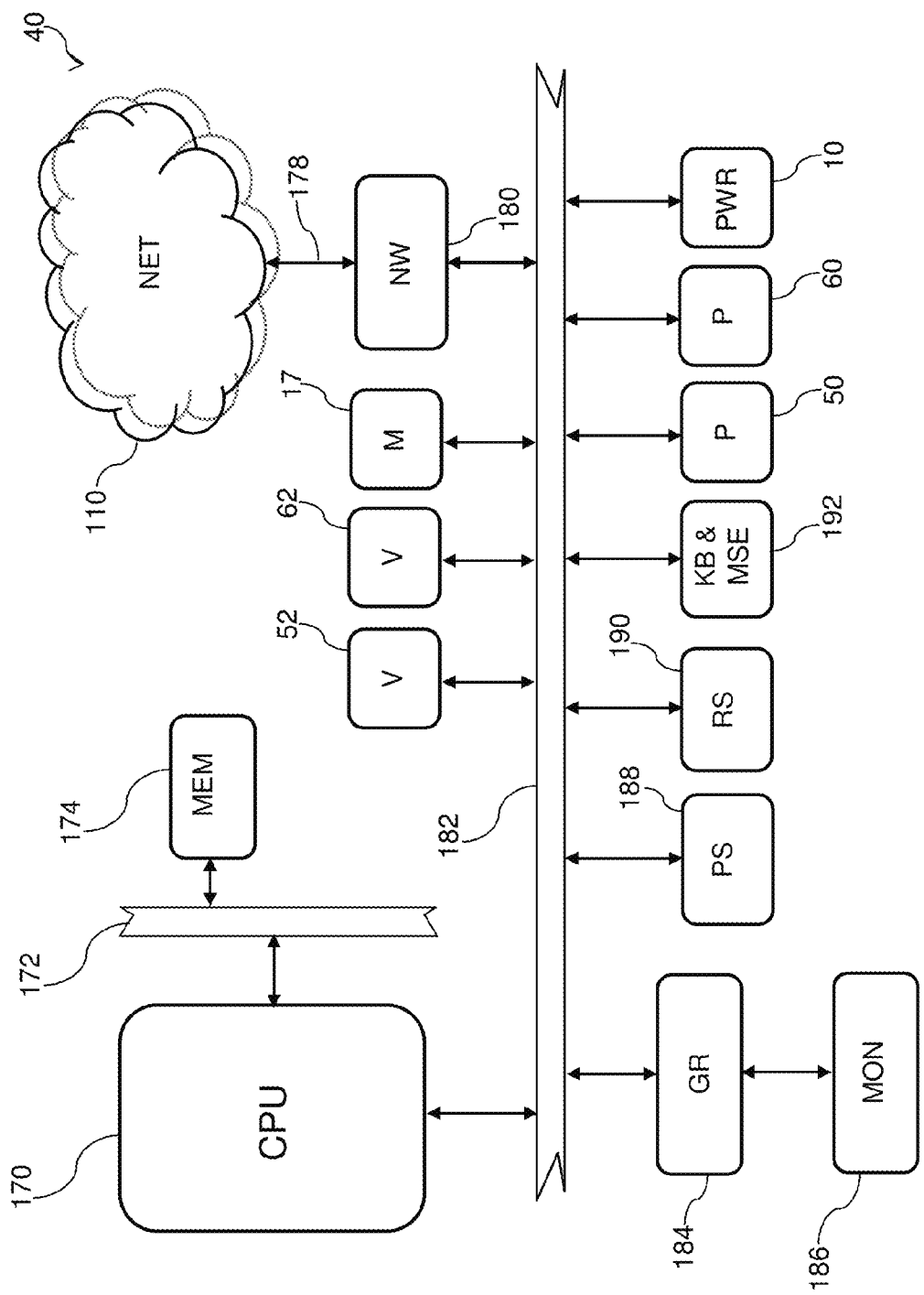
FIG. 3 illustrates a schematic view of an exemplary controller of a system for recovering metals.

Referring to FIG. 3, a schematic view of an exemplary controller 40 of a system 5/5A for recovering precious metals is shown. This example computer system 40 represents a typical computer system 40 used to control various aspects of the system for recovering precious metals. The example computer system 40 is shown in its simplest form, having a single processor. Many different computer architectures are known that accomplish similar results in a similar fashion and the present invention is not limited in any way to any particular computer system. The present invention works well utilizing a single processor system, as shown in FIG. 2, a multiple processor system where multiple processors share resources such as memory and storage, a multiple server system where several independent servers operate in parallel (perhaps having shared access to the data or any combination). In any of these systems, a processor 170 executes or runs stored programs that are generally stored for execution within a memory 174. The processor 170 is any processor or a group of processors, for example an Intel Pentium-4® CPU or the like. The memory 174 is connected to the processor by a memory bus 172 and is any memory 174 suitable for connection with the selected processor 170, such as SRAM, DRAM, SDRAM, RDRAM, DDR, DDR-2, etc. Also connected to the processor 170 is a system bus 182 for connecting to peripheral subsystems such as a network interface 180, persistent storage (e.g. a hard disk) 188, removable storage (e.g. DVD, CD, flash drive) 190, a graphics adapter 184 and a keyboard/mouse 192. The graphics adapter 184 receives commands and display information from the system bus 182 and generates a display image that is displayed on the display 186.

In general, the persistent storage 188 is used to store programs, executable code and data such as user financial data in a persistent manner. The removable storage 190 is used to load/store programs, executable code, images and data onto the persistent storage 188. These peripherals are examples of input/output devices 180/184/192, persistent storage 188 and removable storage 190. Other examples of persistent storage include core memory, FRAM, flash memory, etc. Other examples of removable media storage include CDRW, DVD, DVD writeable, Blu-ray, compact flash, other removable flash media, floppy disk, etc. In some embodiments, less devices or other devices are connected to the system through the system bus 182 or with other input-output connections/arrangements as known in the industry. Examples of these devices include printers; graphics tablets; joysticks; and communications adapters such as modems and Ethernet adapters. In such, any of the prior devices 184/188/190/180/192 are optionally present.

Various components of the system for recovering precious metals 5 are controlled by the controller 40 such as the pumps 50/60, the power supply 10, the valves 52/62, and the electrode moving mechanism(s) 17. For example, the controller 40 instructs the power supply 10 to apply the required voltage to the collection grid 68 as the controller instructs the valve 62 to open and the pump 60 to initiate flow through the collection grid 68.

In systems 5/5A in which a wide-area connection or connection to other system is needed, the network interface 180 connects the computer-based system to the network 110 through a link 178 which is, preferably, a high speed link such as a cable broadband connection, a Digital Subscriber Loop (DSL) broadband connection, a T1 line, or a T3 line.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of capturing metal particles from a substrate material, the method comprising:
   introducing a feedstock into a pressure vessel, the feedstock comprising metal particles suspended within a substrate fluid;
   forming an electric arc between one or more pairs of electrodes within the pressure vessel;
   circulating the feedstock through a plasma of the electric arc and through a collection grid, whereas the plasma of the electric arc providing a charge to at least some of the metal particles and collection plates of the collection grid attracting and collecting at least a subset of the metal particles; and
   capturing the metal particles from the collection plates.

2. The method of claim 1, further comprising capturing a gas produced from the feedstock by the plasma.

3. The method of claim 1, wherein at least one of the collection plates is positively charged.

4. The method of claim 1, wherein the feedstock is sludge from a bed of a water body.

5. The method of claim 1, wherein the feedstock is residue from a mining operation.

* * * * *